(12) United States Patent
Kuo et al.

(10) Patent No.: US 11,926,113 B2
(45) Date of Patent: Mar. 12, 2024

(54) OPTICAL ELEMENT AND METHOD FOR MANUFACTURING OPTICAL ELEMENT

(71) Applicant: HIMAX TECHNOLOGIES LIMITED, Tainan (TW)

(72) Inventors: Han Yi Kuo, Tainan (TW); Shu-Hao Hsu, Tainan (TW); Yin Tung Lu, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 17/817,346

(22) Filed: Aug. 3, 2022

(65) Prior Publication Data

US 2024/0042712 A1  Feb. 8, 2024

(51) Int. Cl.
| | |
|---|---|
| G02B 6/136 | (2006.01) |
| B29D 11/00 | (2006.01) |
| B32B 7/023 | (2019.01) |
| B32B 7/12 | (2006.01) |
| B32B 17/10 | (2006.01) |

(52) U.S. Cl.
CPC .......... *B29D 11/0073* (2013.01); *B32B 7/023* (2019.01); *B32B 7/12* (2013.01); *B32B 17/10* (2013.01); *B32B 2307/412* (2013.01); *B32B 2307/418* (2013.01); *B32B 2551/00* (2013.01); *G02B 6/136* (2013.01)

(58) Field of Classification Search
None
See application file for complete search history.

(56) References Cited

U.S. PATENT DOCUMENTS

| | | | |
|---|---|---|---|
| 2018/0074234 A1* | 3/2018 | Chen | G02B 5/0268 |
| 2018/0164475 A1* | 6/2018 | Meyer | G02B 5/0231 |
| 2019/0129088 A1* | 5/2019 | Lu | G02B 27/0101 |

* cited by examiner

*Primary Examiner* — Shamim Ahmed

(74) *Attorney, Agent, or Firm* — CKC & Partners Co., LLC

(57) ABSTRACT

An optical element and a method for manufacturing the optical element are described. The optical element includes a transparent substrate, an optical layer, and an adhesive layer. The optical layer is located on a surface of the transparent substrate. The optical layer has a first surface and a second surface, which are opposite to each other. The first surface is set with various diffracting optical structures. A refractive index of the optical layer is equal to or greater than 1.4. The adhesive layer is sandwiched between the surface of the transparent substrate and the second surface of the optical layer.

17 Claims, 9 Drawing Sheets

OPTICAL ELEMENT AND METHOD FOR MANUFACTURING OPTICAL ELEMENT

BACKGROUND

Field of Invention

The present disclosure relates to an optical technique. More particularly, the present disclosure relates to an optical element and a method for manufacturing the optical element.

Description of Related Art

In the optical field, the using of optical elements with high diffraction angles enables optical devices to have better optical performance. In a convention method for manufacturing an optical element, a glue layer is firstly formed on a transparent substrate, and diffracting optical structures are directly imprinted in the glue layer. Thus, the refraction and the diffraction are limited by a refractive index of the glue layer.

SUMMARY

Therefore, one objective of the present disclosure is to provide an optical element and a method for manufacturing the optical element, in which various diffracting optical structures are formed on an optical layer, which is made from a high refractive index material, such that the optical element with a higher diffraction angle is obtained.

According to the above objectives, the present disclosure provides an optical element. The optical element includes a transparent substrate, an optical layer, and an adhesive layer. The optical layer is located on a surface of the transparent substrate. The optical layer has a first surface and a second surface, which are opposite to each other. The first surface is set with various diffracting optical structures. A refractive index of the optical layer is equal to or greater than 1.4. The adhesive layer is sandwiched between the surface of the transparent substrate and the second surface of the optical layer.

According to one embodiment of the present disclosure, the adhesive layer includes an optically clear adhesive.

According to one embodiment of the present disclosure, the adhesive layer includes a pressure sensitive adhesive.

According to one embodiment of the present disclosure, a refractive index of the adhesive layer is equal to or greater than 1.4.

According to the above objectives, the present disclosure further provides a method for manufacturing an optical element. In this method, a carrier is provided. A bonding layer is attached to a surface of the carrier. A mold layer is formed on the bonding layer. The mold layer has a first surface and a second surface, which are opposite to each other. The first surface is adjacent to the bonding layer, and the second surface is set with various microstructures. An anti-sticking treatment is performed on the second surface of the mold layer. An optical layer is formed on the second surface of the mold layer after performing the anti-sticking treatment. The optical layer covers and fills the microstructures. A transparent substrate is adhered to the optical layer using an adhesive layer. The optical layer and the transparent substrate are respectively located on two opposite sides of the adhesive layer. The carrier is removed from the bonding layer. The bonding layer and the mold layer are removed from the optical layer.

According to one embodiment of the present disclosure, the bonding layer is an adhesive tape.

According to one embodiment of the present disclosure, forming the mold layer on the bonding layer includes coating a glue layer on the bonding layer, and forming the microstructures on a surface of the glue layer to form the mold layer.

According to one embodiment of the present disclosure, forming the microstructures on the surface of the glue layer includes performing an imprinting step on the surface of the glue layer to press an imprinting mold on the surface of the glue layer, curing the glue layer when the imprinting mold is pressed on the surface of the glue layer, and removing the imprinting mold.

According to one embodiment of the present disclosure, curing the glue layer includes performing an ultraviolet light (UV) exposure treatment or a thermal curing treatment.

According to one embodiment of the present disclosure, performing the anti-sticking treatment includes depositing an anti-sticking material on the second surface of the mold layer, or performing a surface modification treatment on the second surface of the mold layer.

According to one embodiment of the present disclosure, forming the optical layer includes using an atomic layer deposition method, a sputtering method, an evaporation method, or a spin coating method.

According to one embodiment of the present disclosure, a refractive index of the optical layer is equal to or greater than 1.4.

According to one embodiment of the present disclosure, between forming the optical layer and adhering the transparent substrate to the optical layer, the method further includes performing a plasma cleaning step on the optical layer.

According to one embodiment of the present disclosure, performing the plasma cleaning step includes using an oxygen plasma. The cleaning method is not limited thereto.

According to one embodiment of the present disclosure, adhering the transparent substrate to the optical layer using the adhesive layer includes adhering the adhesive layer to the optical layer, and adhering the transparent substrate to the adhesive layer.

According to one embodiment of the present disclosure, the adhesive layer includes a pressure sensitive adhesive.

According to one embodiment of the present disclosure, adhering the transparent substrate to the optical layer using the adhesive layer includes coating an optically clear adhesive on the optical layer to form the adhesive layer, and adhering the transparent substrate to the adhesive layer.

According to one embodiment of the present disclosure, removing the carrier from the bonding layer includes performing a heat treatment to reduce a bonding force between the carrier and the bonding layer, and separating the carrier and the bonding layer.

According to one embodiment of the present disclosure, removing the carrier from the bonding layer includes performing a laser ablation step on the bonding layer, and separating the carrier and the bonding layer.

According to one embodiment of the present disclosure, removing the carrier from the bonding layer includes performing an etching step on the carrier to reduce the carrier.

According to one embodiment of the present disclosure, removing the bonding layer and the mold layer from the optical layer includes adhering an adhesive tape to the bonding layer, and using the adhesive tape to pull the bonding layer and the mold layer away from the optical layer.

BRIEF DESCRIPTION OF THE DRAWINGS

Aspects of the present disclosure are best understood from the following detailed description in conjunction with the accompanying figures. It is noted that in accordance with the standard practice in the industry, various features are not drawn to scale. In fact, dimensions of the various features can be arbitrarily increased or reduced for clarity of discussion.

DETAILED DESCRIPTION

Figure 1:
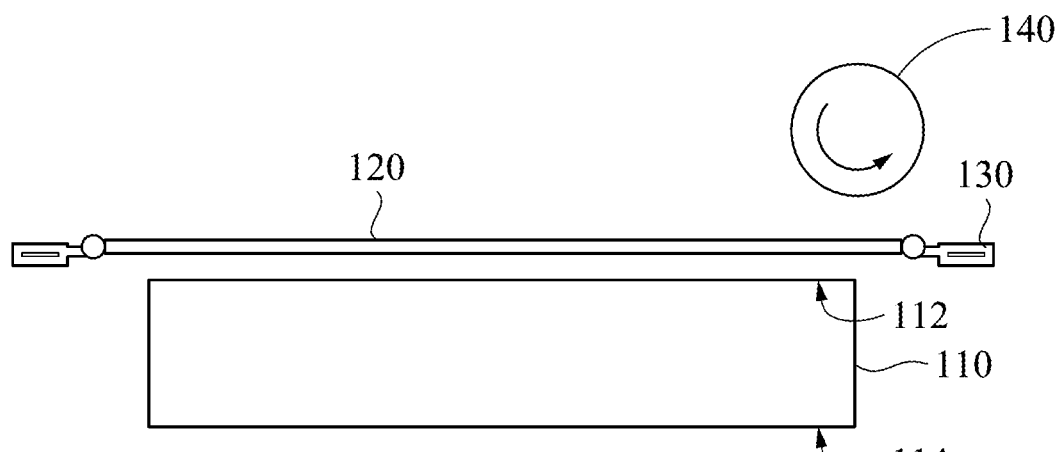
FIG. 1 through FIG. 9, FIG. 10A, FIG. 11, FIG. 12A, FIG. 13 through FIG. 16 are schematic diagrams of intermediate stages in a method for manufacturing of an optical element in accordance with one embodiment of the present disclosure.

The embodiments of the present disclosure are discussed in detail below. However, it will be appreciated that the embodiments provide many applicable concepts that can be implemented in various specific contents. The embodiments discussed and disclosed are for illustrative purposes only and are not intended to limit the scope of the present disclosure. All of the embodiments of the present disclosure disclose various different features, and these features may be implemented separately or in combination as desired.

In addition, the terms "first", "second", and the like, as used herein, are not intended to mean a sequence or order, and are merely used to distinguish elements or operations described in the same technical terms.

The spatial relationship between two elements described in the present disclosure applies not only to the orientation depicted in the drawings, but also to the orientations not represented by the drawings, such as the orientation of the inversion. Moreover, the terms "connected", "electrically connected", or the like between two components referred to in the present disclosure are not limited to the direct connection or electrical connection of the two components, and may also include indirect connection or electrical connection as required.

Referring to FIG. 1 through FIG. 9, FIG. 10A, FIG. 11, FIG. 12A, FIG. 13 through FIG. 16, FIG. 1 through FIG. 9, FIG. 10A, FIG. 11, FIG. 12A, FIG. 13 through FIG. 16 are schematic diagrams of intermediate stages in a method for manufacturing of an optical element in accordance with one embodiment of the present disclosure. In the manufacturing of an optical element 100 shown in FIG. 16, a carrier 110 may be firstly provided, as shown in FIG. 1. The carrier 110 may be a flat plate. For example, the carrier 110 has two opposite surfaces 112 and 114, in which at least the surface 112 is a flat surface. The carrier 110 may be a glass flat plate. For example, a thickness of the carrier 110 may be 300 μm.

Figure 2:
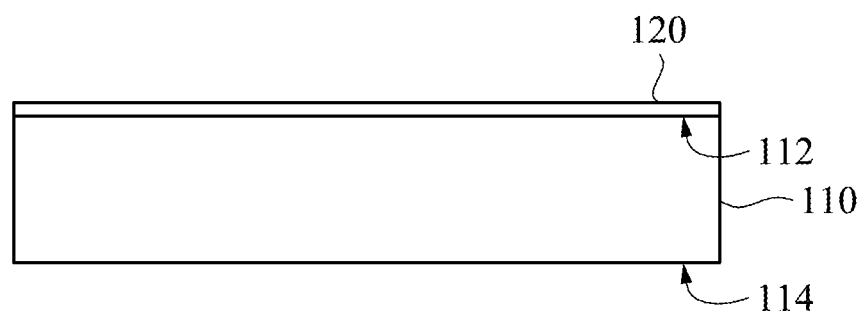

Next, a bonding layer 120 may be adhered to the surface 112 of the carrier 110, as shown in FIG. 2. The surface 112 of the carrier 110 is a flat surface, such that the bonding layer 120 can be smoothly adhered to the surface 112. Referring to FIG. 1 again, in some examples, the bonding layer 120 is held by a clamping apparatus 130. Then, the bonding layer 120 may be pressed onto the surface 112 of the carrier 110 by using, for example, a roller 140. The bonding layer 120 may be an adhesive tape.

Figure 6:
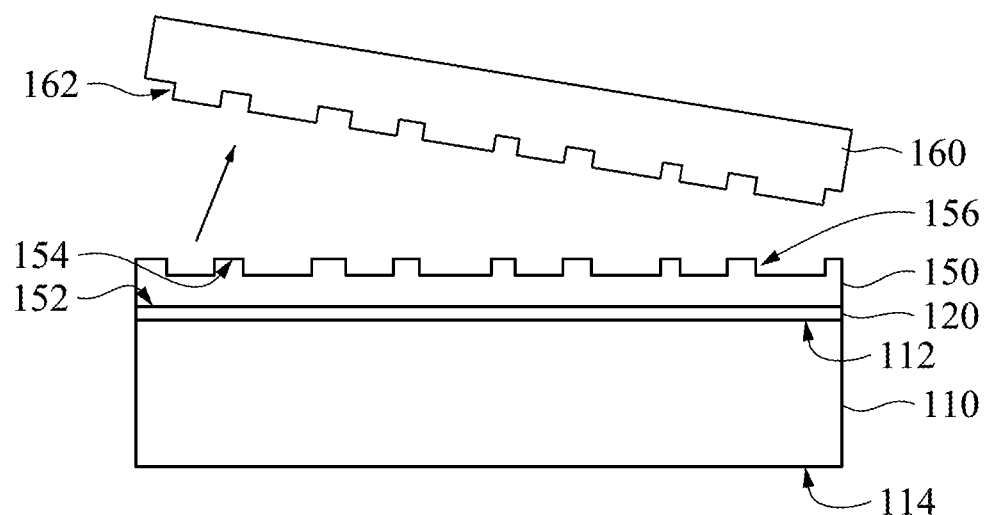

After the bonding layer 120 is adhered to the carrier 110, a mold layer 150 shown in FIG. 6 may be formed on the bonding layer 120. The mold layer 150 has a first surface 152 and a second surface 154, in which the first surface 152 and the second surface 154 are opposite to each other. The first surface 152 is adjacent to the bonding layer 120. For example, the first surface 152 may directly contact with the bonding layer 120. The second surface 154 is set with microstructures 156.

Figure 3:
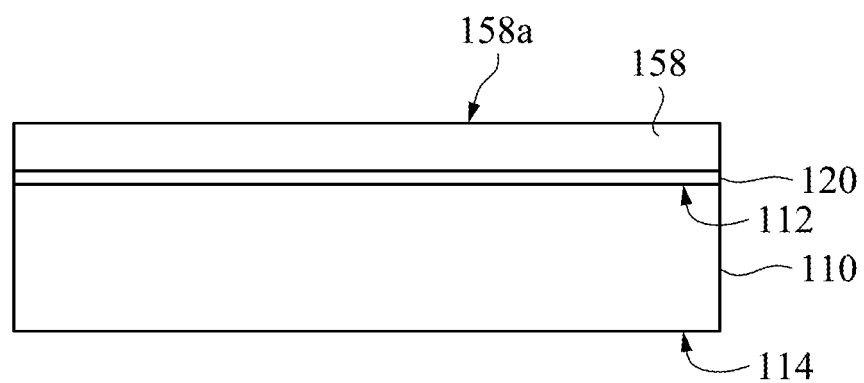
Figure 4:
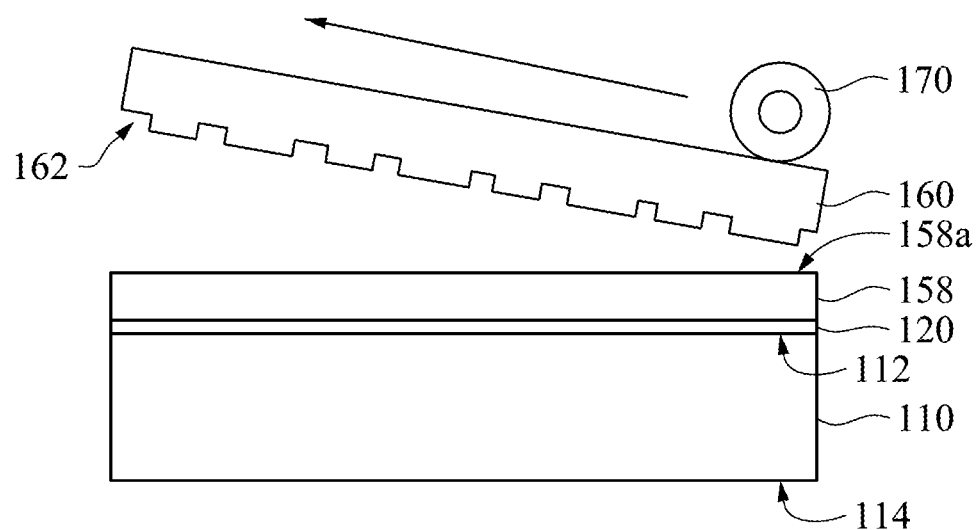
Figure 5:
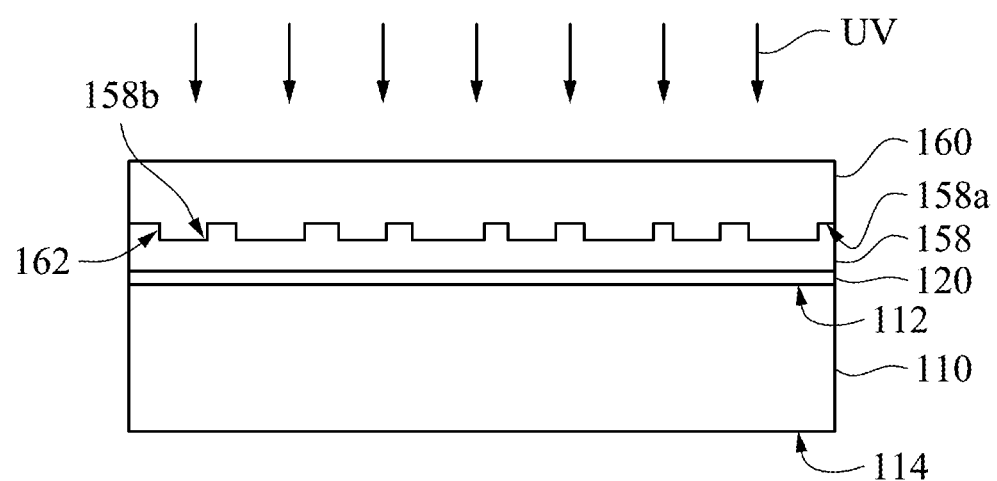

In some examples, in the formation of the mold layer 150, a glue layer 158 is coated on the bonding layer 120, as shown in FIG. 3. For example, the glue layer 158 may be formed on the bonding layer 120 by using a spin coating method. Then, the microstructures 156 are formed on a surface 158a of the glue layer 158, such that the mold layer 150 with the microstructures 156 is formed. That is the mold layer 150 is composed of the glue layer 158. In some examples, in the forming of the microstructures 156, an imprinting step is performed on the surface 158a of the glue layer 158 by using an imprinting mold 160. The imprinting mold 160 includes a pattern structure 162. In the imprinting step, as shown in FIG. 4 and FIG. 5, the imprinting mold 160 is pressed on the surface 158a of the glue layer 158 while the glue layer 158 is has not hardened, such that a portion of the glue layer 158 is embedded in the pattern structure 162. The imprinting step may be performed by using a roller 170 to press the imprinting mold 160 onto the surface 158a of the glue layer 158.

In some examples, as shown in FIG. 5, when the imprinting mold 160 is pressed on the surface 158a of the glue layer 158, the glue layer 158 is cured to maintain a shape of the surface 158a of the glue layer 158. Thus, after curing, a pattern structure 158b, which is opposite to the pattern structure 162 of the imprinting mold 160, is formed on the surface 158a of the glue layer 158. In some exemplary examples, the glue layer 158 is cured by using an ultraviolet light UV to perform an ultraviolet light exposure treatment on the glue layer 158. In the example that the glue layer 158 is cured by using the ultraviolet light UV, the imprinting mold 160 is transparent to the ultraviolet light UV. The glue layer 158 may be cured by performing a thermal curing treatment on the glue layer 158. A material of the imprinting mold 160 may be, for example, resin polymer, metal, or oxide, but the material of the imprinting mold 160 is not limited thereto. Then, as shown in FIG. 6, the imprinting mold 160 is removed to complete the formation the microstructures 156 of the mold layer 150.

Figure 7:
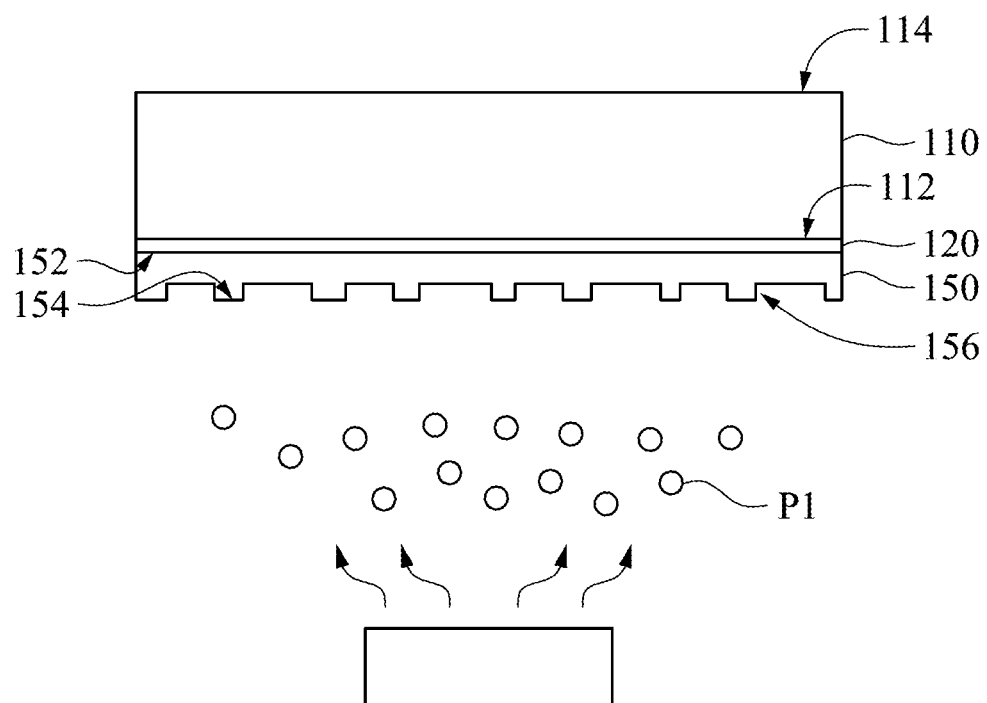

After the mold layer 150 is formed, an anti-sticking treatment may be performed on the second surface 154 of the mold layer 150. In some examples, as shown in FIG. 7, in the anti-sticking treatment, the stacked structure including the carrier 110, the bonding layer 120, and the mold layer 150 is flipped, and an anti-sticking material P1 is deposited on the second surface 154 of the mold layer 150 by using, for example, an evaporation method. In another example, in the anti-sticking treatment, a surface modification treatment is performed on the second surface 154 of the mold layer 150 to make the second surface 154 have an anti-sticking property. The surface modification treatment may be performed by using plasma.

Figure 8:
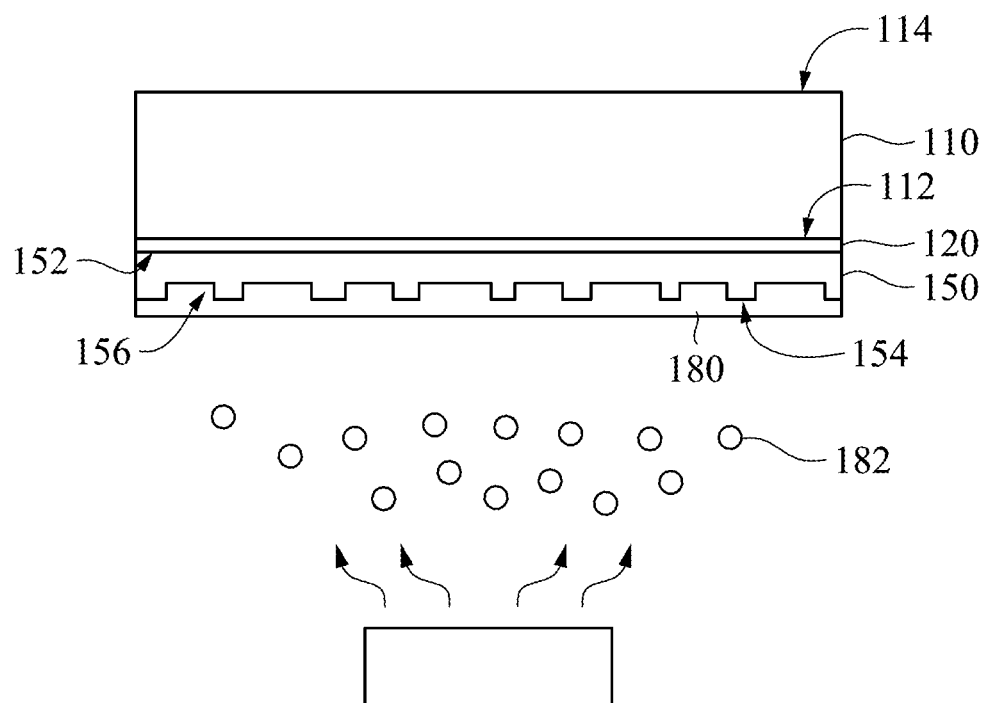

After performing the anti-sticking treatment, the optical layer 180 may be formed on the second surface 154 of the mold layer 150 by using, for example, an atomic layer deposition method, a sputtering method, an evaporation method, or a spin coating method. The optical layer 180 covers the microstructures 156 of the mold layer 150 and fills the microstructures 156, such that a surface structure, which is opposite to a topographical structure of the second surface 154 of the mold layer 150, is formed on the optical layer 180. In some exemplary examples, as shown in FIG. 8, an optical material 182 is deposited on the second surface 154 of the mold layer 150 to form the optical layer 180 on the second surface 154. The optical layer 180 is formed from a high refractive index material. For example, a refractive index of the optical layer 180 may be equal to or greater than 1.4.

Figure 9:
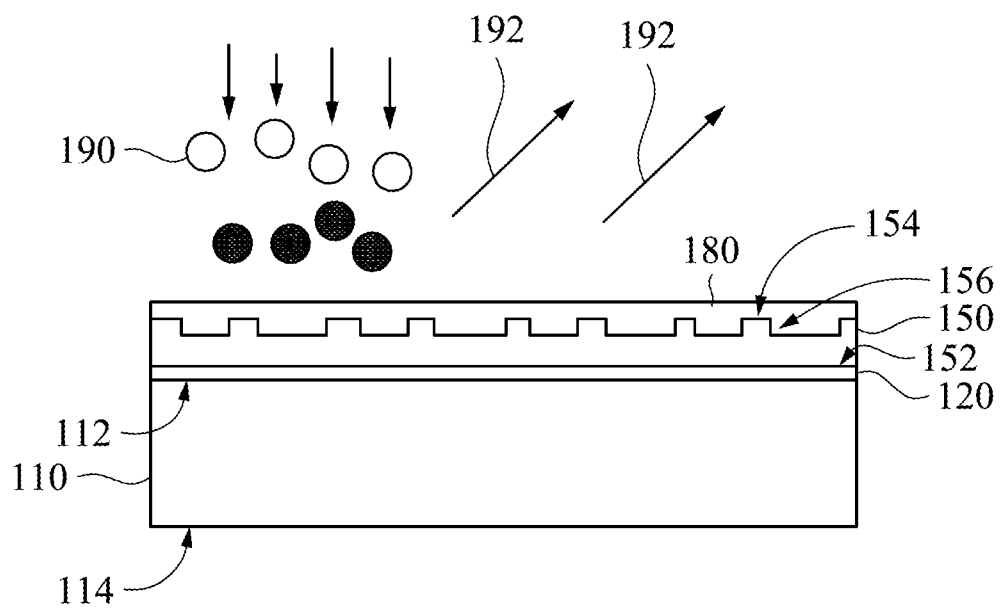

In some examples, after the optical layer 180 is formed, the stacked structure including the carrier 110, the bonding layer 120, the mold layer 150, and the optical layer 180 is flipped. Then, as shown in FIG. 9, a plasma cleaning step may be optionally performed on the optical layer 180 to use a plasma 190 to clean the optical layer 180. For example, the plasma 190 may be an oxygen plasma. During the plasma cleaning step, products 192 are pumped out. The products 192 may be $H_2O$ and/or $CO_2$.

Figure 11:
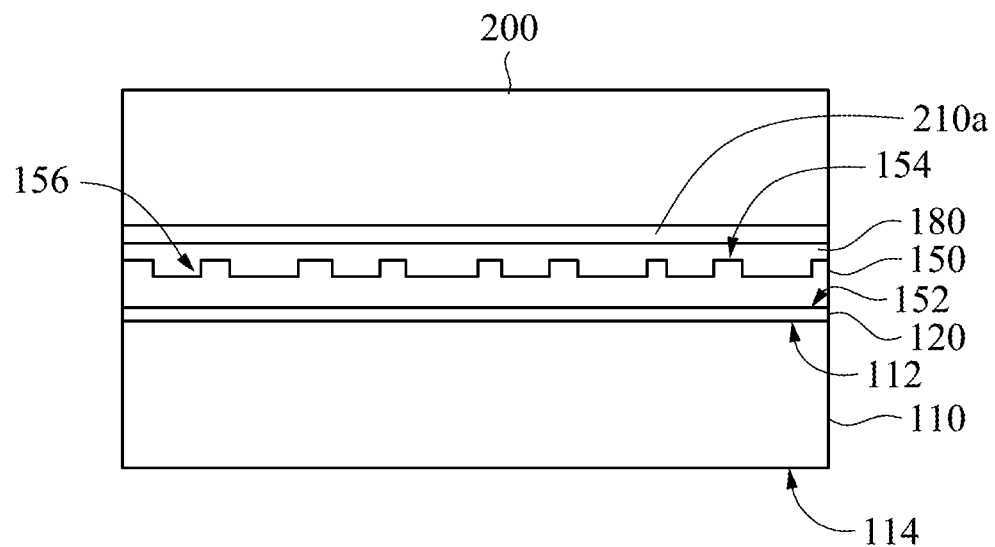

Next, as shown in FIG. 11, a transparent substrate 200 may be adhered to the optical layer 180 by using an adhesive layer 210a, such that the optical layer 180 and the transparent substrate 200 are respectively located on two opposite sides of the adhesive layer 210a. The transparent substrate 200 is a substrate with a high refractive index. In some exemplary examples, the transparent substrate 200 may be a glass substrate.

Figure 10A:
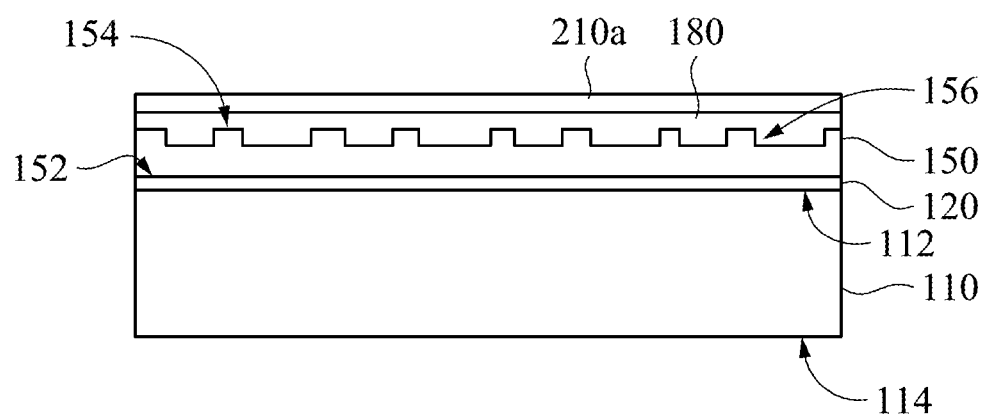

In some examples, as shown in FIG. 10A, in the operation of adhering the transparent substrate 200 to the optical layer 180, the adhesive layer 210a is adhered to the optical layer 180, and then the transparent substrate 200 is placed on and is adhered to the adhesive layer 210a. In such examples, the adhesive layer 210a is a double-sided tape. The adhesive layer 210a may include a pressure sensitive adhesive. The adhesive layer 210a is transparent. A haze of the adhesive layer 210a may be, for example, smaller than 0.5%, but the present embodiment is not limited thereto. In some exemplary examples, a material of the adhesive layer 210a is a high refractive index material. For example, a refractive index of the adhesive layer 210a may be equal to or greater than 1.4.

Figure 10B:
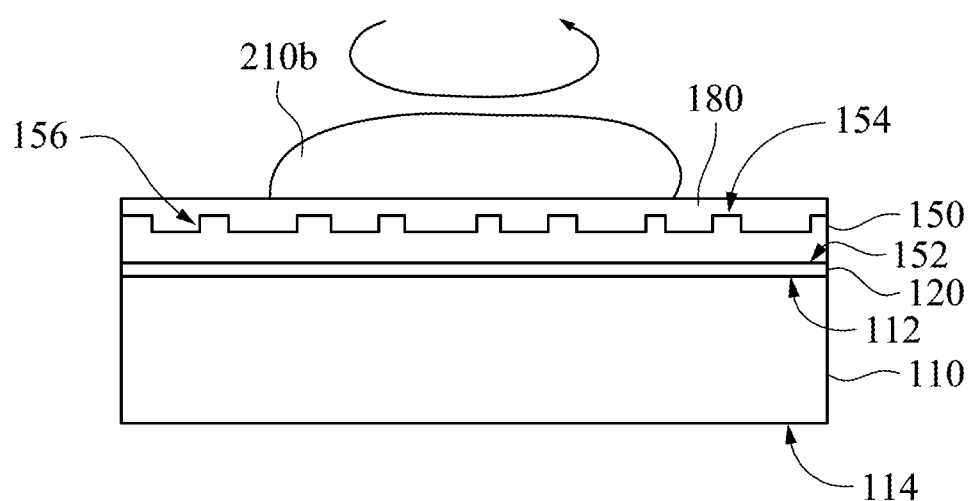
FIG. 10B is a schematic diagram showing forming an adhesive layer on an optical layer in accordance with another embodiment of the present disclosure.

In some examples, as shown in FIG. 10B, in the operation of adhering the transparent substrate 200 to the optical layer 180, an optically clear adhesive 210b is coated on the optical layer 180 to form the adhesive layer. The optically clear adhesive 210b may be formed on the optical layer 180 by a spin coating method. Next, the transparent substrate 200 is placed on and is adhered to the adhesive layer composed of the optically clear adhesive 210b. A haze of the optically clear adhesive 210b may be, for example, smaller than 0.5%, but the present embodiment is not limited thereto. In some exemplary examples, a material of the optically clear adhesive 210b is a high refractive index material. For example, a refractive index of the optically clear adhesive 210b may be equal to or greater than 1.4.

Figure 12A:
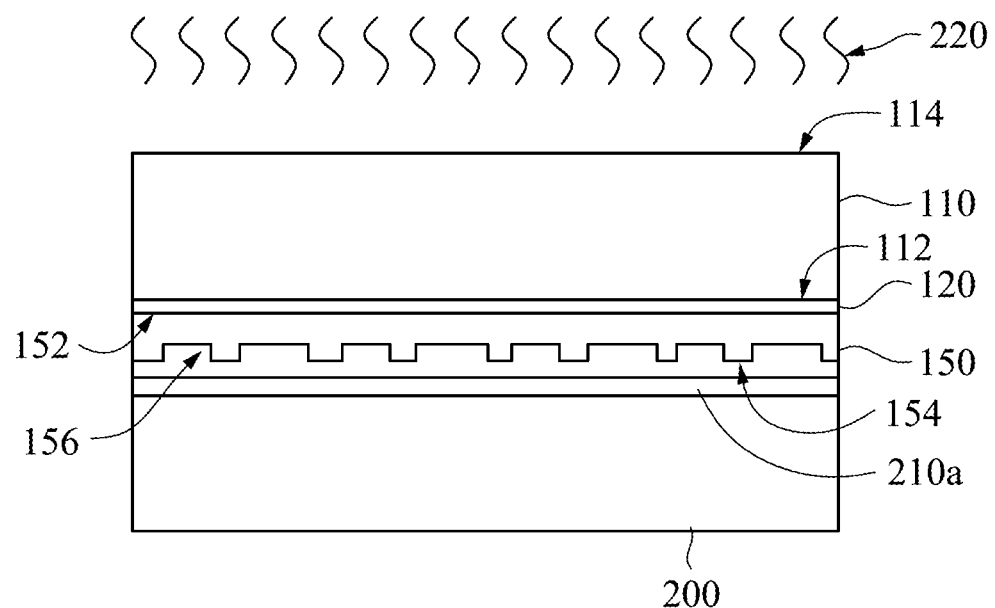
Figure 12B:
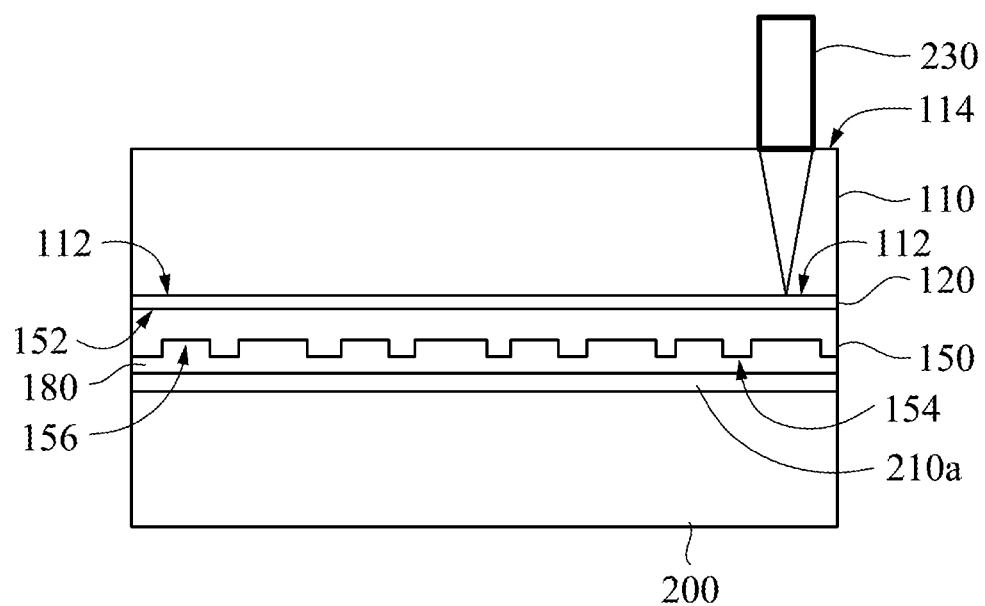
FIG. 12B is a schematic diagram showing performing a laser ablation step on a bonding layer in accordance with another embodiment of the present disclosure.
Figure 12C:
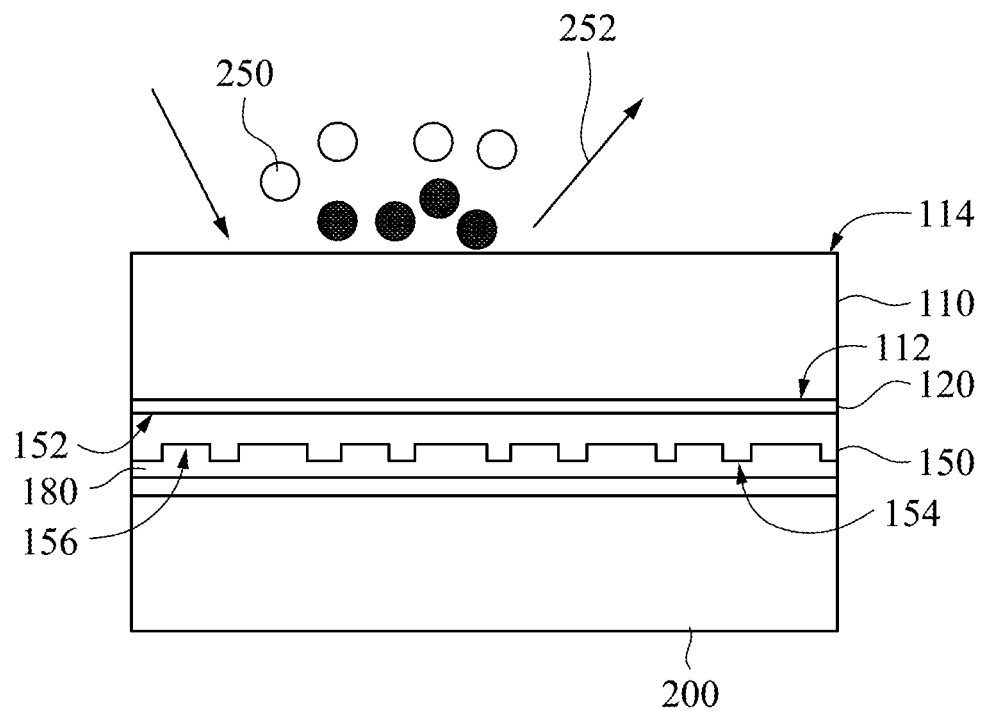
FIG. 12C is a schematic diagram showing performing a laser ablation step on a bonding layer in accordance with still another embodiment of the present disclosure.
Figure 13:
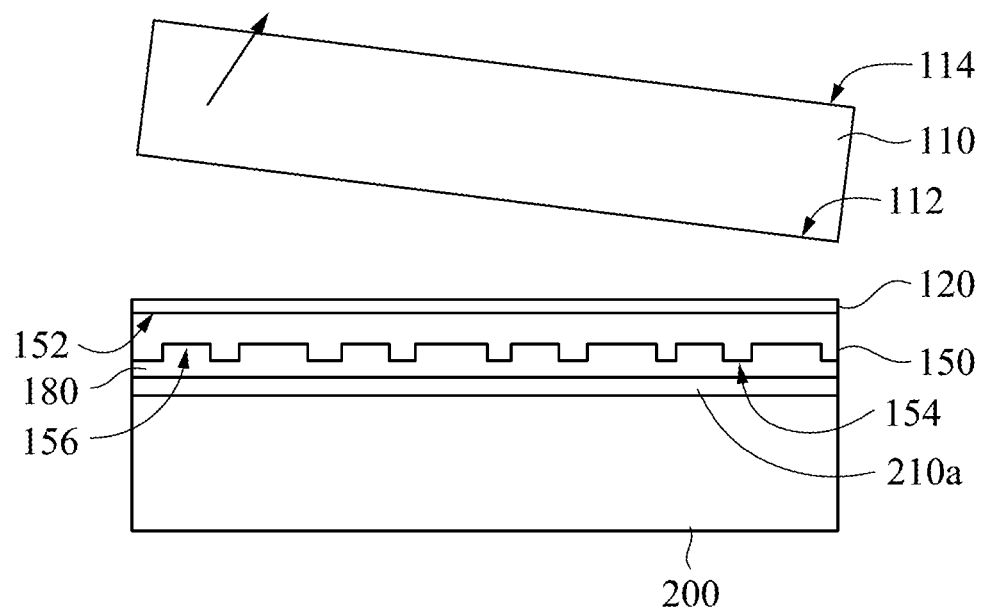

Then, as shown in FIG. 13, the carrier 110 is removed from the bonding layer 120. In some examples, as shown in FIG. 12A, in the operation of removing the carrier 110, a heat treatment 220 is performed to reduce a bonding force between the carrier 110 and the bonding layer 120. Thus, after the heat treatment 220, the carrier 110 and the bonding layer 120 can be separated from each other easier. In another example, as shown in FIG. 12B, in the operation of removing the carrier 110, a laser ablation step is firstly performed on the bonding layer 120 by using a laser device 230, such that the carrier 110 and the bonding layer 120 can be separated from each other successfully. In still another example, as shown in FIG. 12C, in the operation of removing the carrier 110, an etching step is performed on the carrier 110 by using an etchant 250 to reduce the carrier 110 until the carrier 110 is removed. In the examples that the carrier 110 is formed from silicon dioxide ($SiO_2$), the etchant 250 may be hydrogen fluoride (HF), and products 252 generated during the etching step is silicon fluoride ($SiF_4$) and water ($H_2O$). In the examples that the carrier 110 is formed from calcium metasilicate ($CaSiO_3$), the etchant 250 may be hydrogen fluoride, and the products 252 silicon fluoride, water, and calcium fluoride ($CaF_2$).

Figure 14:
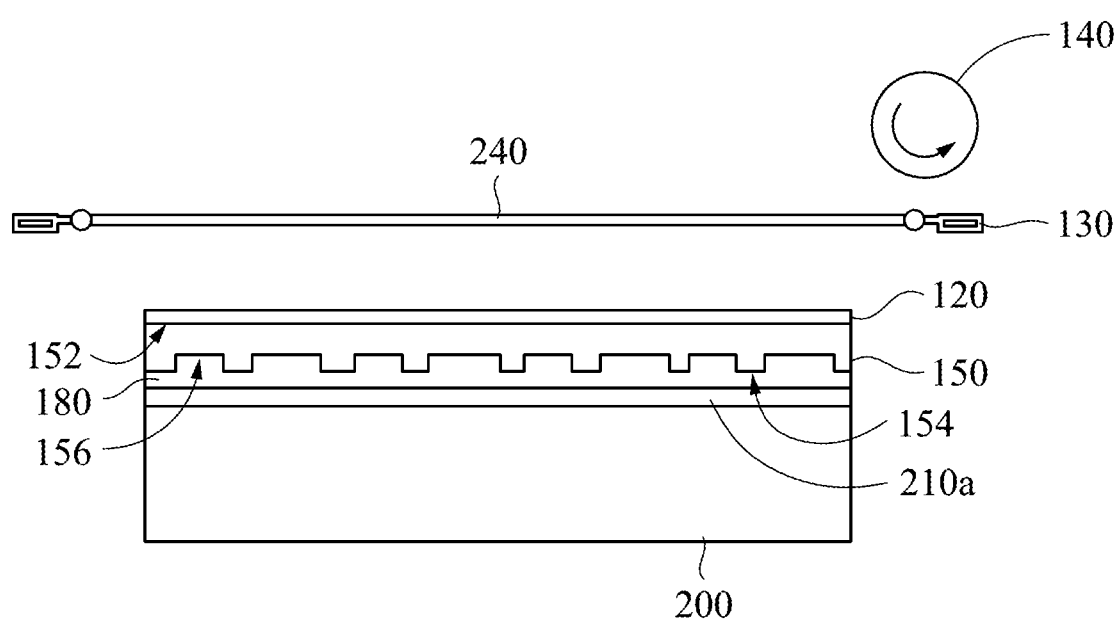
Figure 15:
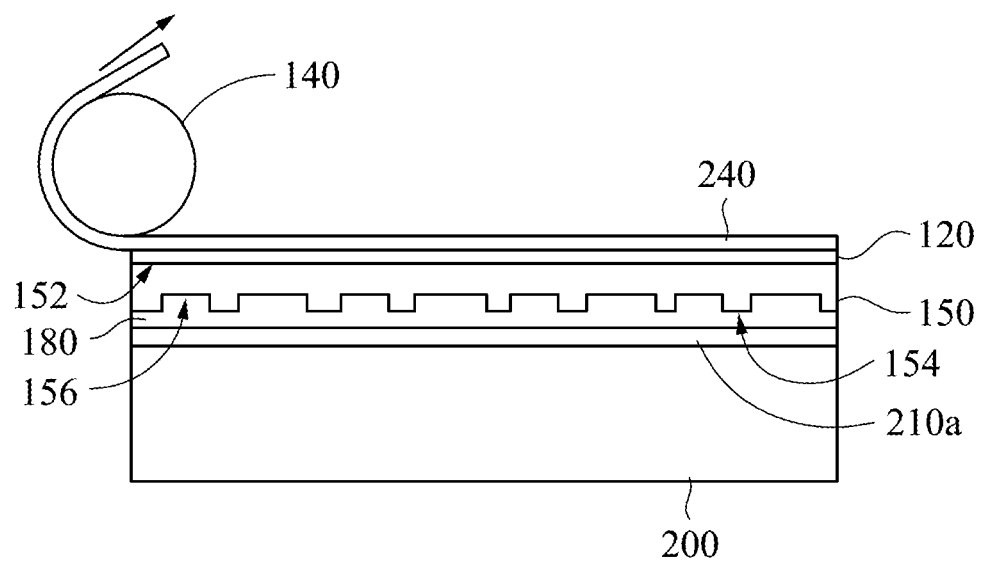

After the carrier 110 is removed, the bonding layer 120 and the mold layer 150 may be removed from the optical layer 180. The bonding layer 120 and the mold layer 150 may be removed simultaneously. For example, in the operation of removing the bonding layer 120 and the mold layer 150, as shown in FIG. 14, an adhesive tape 240 may be adhered to the bonding layer 120. In some examples, the adhesive tape 240 may be held by the clamping apparatus 130. Then, the adhesive tape 240 may be pressed onto the bonding layer 120 by using the roller 140. Sequentially, as shown in FIG. 15 and FIG. 16, the bonding layer 120 and the mold layer 150 may be pulled by using the adhesive tape 240, so as to complete the formation of the optical element 100.

The anti-sticking treatment has been performed on the second surface 154 of the mold layer 150, such that a bonding force between the second surface 154 of the mold layer 150 and the optical layer 180 is smaller than a bonding surface between the first surface 152 of the mold layer 150 and the bonding layer 120. Therefore, the mold layer 150 can be separated from the optical layer 180 successfully, and the bonding layer 120 and the mold layer 150 can be easily pulled away.

Figure 16:
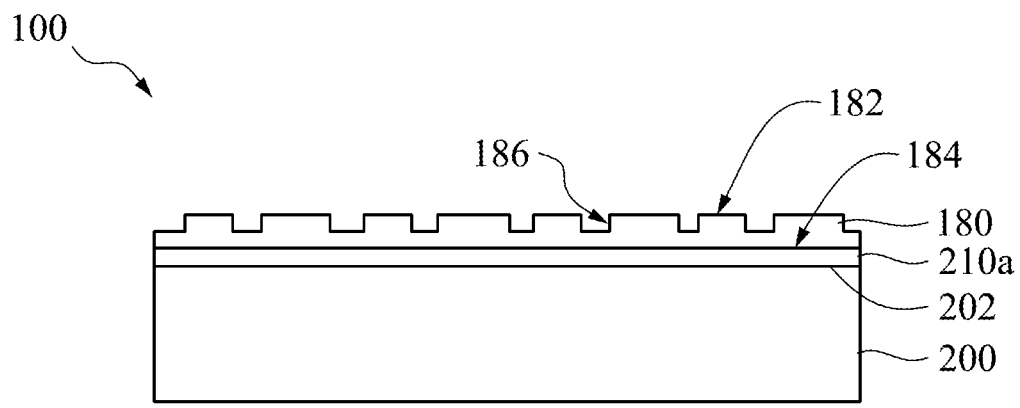

Referring to FIG. 16 continuously, the optical element 100 includes the transparent substrate 200, the adhesive layer 210a, and the optical layer 180. The optical layer 180 has a first surface 182 and a second surface 184 on two opposite sides of the optical layer 180. The optical layer 180 is located on a surface 202 of the transparent substrate 200. The adhesive layer 210a is sandwiched between the surface 202 of the transparent substrate 200 and the second surface 184 of the optical layer 180. After the mold layer 150 is pulled away from the first surface 182 of the optical layer 180, the first surface 182 is formed with diffracting optical structures 186. For example, each of the diffracting optical structures 186 may be a slanting structure, a binary structure, a stepped structure, a triangle structure, or a trapezoid structure.

According to the embodiments described above, one advantage of the present disclosure is that various diffracting optical structures are formed on an optical layer, which is made from a high refractive index material, such that the optical element with a higher diffraction angle is obtained.

The features of several embodiments are outlined above, so those skilled in the art can understand the aspects of the present disclosure. Those skilled in the art will appreciate that the present disclosure can be readily utilized as a basis for designing or modifying other processes and structures, thereby achieving the same objectives and/or achieving the same advantages as the embodiments described herein. Those skilled in the art should also understand that these equivalent constructions do not depart from the spirit and scope of the present disclosure, and they can make various changes, substitutions, and alteration without departing from the spirit and scope of the present disclosure.

What is claimed is:

1. A method for manufacturing an optical element, and the method comprising:
providing a carrier;
attaching a bonding layer to a surface of the carrier;
forming a mold layer on the bonding layer, wherein the mold layer has a first surface and a second surface, which are opposite to each other, the first surface is adjacent to the bonding layer, and the second surface is set with a plurality of microstructures;
performing an anti-sticking treatment on the second surface of the mold layer;
forming an optical layer on the second surface of the mold layer after performing the anti-sticking treatment, wherein the optical layer covers and fills the microstructures;
adhering a transparent substrate to the optical layer using an adhesive layer, wherein the optical layer and the transparent substrate are respectively located on two opposite sides of the adhesive layer;
removing the carrier from the bonding layer; and
removing the bonding layer and the mold layer from the optical layer.

2. The method of claim 1, wherein the bonding layer is an adhesive tape.

3. The method of claim 1, wherein forming the mold layer on the bonding layer comprises:
coating a glue layer on the bonding layer; and
forming the microstructures on a surface of the glue layer to form the mold layer.

4. The method of claim 3, wherein forming the microstructures on the surface of the glue layer comprises:
performing an imprinting step on the surface of the glue layer to press an imprinting mold on the surface of the glue layer;
curing the glue layer when the imprinting mold is pressed on the surface of the glue layer; and
removing the imprinting mold.

5. The method of claim 4, wherein curing the glue layer comprises performing an ultraviolet light exposure treatment or a thermal curing treatment.

6. The method of claim 1, wherein performing the anti-sticking treatment comprises depositing an anti-sticking material on the second surface of the mold layer, or performing a surface modification treatment on the second surface of the mold layer.

7. The method of claim 1, wherein forming the optical layer comprises using an atomic layer deposition method, a sputtering method, an evaporation method, or a spin coating method.

8. The method of claim 1, wherein a refractive index of the optical layer is equal to or greater than 1.4.

9. The method of claim 1, wherein between forming the optical layer and adhering the transparent substrate to the optical layer, the method further comprises performing a plasma cleaning step on the optical layer.

10. The method of claim 9, wherein performing the plasma cleaning step comprises using an oxygen plasma.

11. The method of claim 1, wherein adhering the transparent substrate to the optical layer using the adhesive layer comprising:
adhering the adhesive layer to the optical layer; and
adhering the transparent substrate to the adhesive layer.

12. The method of claim 11, wherein the adhesive layer comprises a pressure sensitive adhesive.

13. The method of claim 1, wherein adhering the transparent substrate to the optical layer using the adhesive layer comprising:
coating an optically clear adhesive on the optical layer to form the adhesive layer; and
adhering the transparent substrate to the adhesive layer.

14. The method of claim 1, wherein removing the carrier from the bonding layer comprises:
performing a heat treatment to reduce a bonding force between the carrier and the bonding layer; and
separating the carrier and the bonding layer.

15. The method of claim 1, wherein removing the carrier from the bonding layer comprises:
performing a laser ablation step on the bonding layer; and
separating the carrier and the bonding layer.

16. The method of claim 1, wherein removing the carrier from the bonding layer comprises:
performing an etching step on the carrier to reduce the carrier.

17. The method of claim 1, wherein removing the bonding layer and the mold layer from the optical layer comprises:
adhering an adhesive tape to the bonding layer; and
using the adhesive tape to pull the bonding layer and the mold layer away from the optical layer.

* * * * *